(12) United States Patent
Kim et al.

(10) Patent No.: US 11,249,975 B2
(45) Date of Patent: Feb. 15, 2022

(54) DATA ARCHIVING METHOD AND SYSTEM USING HYBRID STORAGE OF DATA

(71) Applicant: ARMIQ Co., Ltd., Seongdong-gu Seoul (KR)

(72) Inventors: Oxoo Kim, Seongdong-gu Seoul (KR); Sehun Jung, Seongdong-gu Seoul (KR)

(73) Assignee: ARMIQ CO., LTD., Seoul (KR)

( * ) Notice: Subject to any disclaimer, the term of this patent is extended or adjusted under 35 U.S.C. 154(b) by 0 days.

(21) Appl. No.: 17/405,839

(22) Filed: Aug. 18, 2021

(65) Prior Publication Data

US 2021/0374118 A1    Dec. 2, 2021

Related U.S. Application Data

(63) Continuation of application No. PCT/KR2020/018913, filed on Dec. 22, 2020.

(30) Foreign Application Priority Data

Jan. 6, 2020 (KR) .......... 10-2020-0001413
Nov. 6, 2020 (KR) .......... 10-2020-0147425

(51) Int. Cl.
*G06F 16/22* (2019.01)
*G06F 16/27* (2019.01)
(Continued)

(52) U.S. Cl.
CPC ...... *G06F 16/2282* (2019.01); *G06F 16/2322* (2019.01); *G06F 16/24573* (2019.01); *G06F 16/278* (2019.01)

(58) Field of Classification Search
CPC ... G06F 16/113; G06F 16/1744; G06F 16/215
(Continued)

(56) References Cited

U.S. PATENT DOCUMENTS 9,536,058 B2   1/2017   Eun-Bum et al.
10,762,037 B2  9/2020   Shimzu et al.
(Continued)

FOREIGN PATENT DOCUMENTS

JP    10-161913 A     6/1998
JP    2003-204437 A   7/2003
(Continued)

OTHER PUBLICATIONS

Korean Notice of Allowance dated May 26, 2021, issued in corresponding Korean Application No. 10-2020-0147425, filed on Nov. 6, 2020, and its English translation thereof, 8 pages.

*Primary Examiner* — Hung T Vy
(74) *Attorney, Agent, or Firm* — Christensen O'Connor Johnson Kindness PLLC

(57) ABSTRACT

There are provided a data archiving method and system, which can process primary archiving capable of rapidly searching for compressed and stored data by compressing and storing, in a table of a database or another database, at least some of data stored in the database included in a target system, and can process secondary archiving for data for which search is no longer requested or for which a search request is low by storing at least some of the data compressed and stored in the table in the form of a file according to a preset condition.

11 Claims, 20 Drawing Sheets

(51) Int. Cl.
*G06F 16/23* (2019.01)
*G06F 16/2457* (2019.01)

(58) Field of Classification Search
USPC .................................................. 707/793, 693
See application file for complete search history.

(56) References Cited

U.S. PATENT DOCUMENTS

2011/0199241 A1* 8/2011 Torii ..................... H03M 7/30
 341/51
2019/0146946 A1* 5/2019 Zhang ................. G06F 16/1744
 707/667

FOREIGN PATENT DOCUMENTS

| | | |
|---|---|---|
| JP | 2005-235226 A | 9/2005 |
| JP | 2016-091556 A | 5/2016 |
| JP | 6471262 B2 | 2/2019 |
| KR | 101287518 B1 | 8/2013 |
| KR | 10-2014-0072929 A | 6/2014 |
| KR | 10-1656750 B1 | 9/2016 |

* cited by examiner

FIG. 11

| PERIOD | Col1 | OBJECT ID |
|--------|------|-----------|
| 2002.01 | 1000 | O0001 |
| 2002.01 | 2000 | O0002 |
| 2002.02 | 1000 | O0003 |
| 2002.02 | 2000 | O0004 |
| 2002.03 | 1000 | O0005 |
| 2002.03 | 2000 | O0006 |

FIG. 19

| Processing scheme | Detailed technology | Description | Example (before ► after) | |
|---|---|---|---|---|
| Pseudony-mization | Heuristic pseudonymization | Method of substituting values corresponding to identifier with some predetermined rules (N:1) | Beom-soo Lee | Gil-dong Hong |
| | Encryption | Method of substituting personal information by encrypting it by applying algorithm having given rule | 880204-1234567 | A594FB3B130 |
| | Swapping | Method of substituting record of existing DB by associating it with predetermined item value (1:1) | Man, woman | A, B |
| Aggregation | Aggregation | Method of substituting all or some of data by aggregating it (total, average, etc.) | 45 years old (actual age) | 37 years old (total average age) |
| | Micro Aggregation | Method of aggregating only records of specific portion within data set | 2 million Korean won (only the forties having a great income difference) | 3.5 million Korean won (average income in their forties) |
| | Rounding | Method of finally aggregating data applying rounding (round up, round down, round off) | 73kg | 70kg (roundoff) |
| | Rearrangement | Method of avoiding damage to entire information by mixing personal information with information of others | A type (Beom-soo Lee) | O type (Sang-jin Kim) |
| Data Reduction | Delete identifier | Method of simply deleting identifier from original data | 1988.02.04 | 1988 (month, date information deleted) |
| | Partially delete identifier | Method of deleting some of corresponding identifier | 78, Garakbon-dong, Songpa-gu, Seoul | Songpa-gu, Seoul |
| | Reducing Records | Method of deleting all records clearly different from other information | 213cm | deleted |
| | Fully delete identification element | Method of fully deleting potential identification element in addition to identifier | Beom-soo Lee, case No. 101, Father (Man-seok Lee) | Delete all including name |
| Data Suppression | Hiding | Method of converting into average or suppression value of data | Hepatitis group specific person "A" | Specific person "A" |
| | Random Rounding | Method of rounding up or down records based on given number | 45 years old | Forties |
| | Data Range | Method of representing data as range or interval based on given number | 3,300 Korean won | 3,000~4,000 Korean won |
| | Controlled Rounding | Method of matching sums of unmatched rows and columns through control in "random rounding" method | Not used | |
| Data Masking | Adding Random Noise | Method of adding (adding or multiplying) noise, such as given number | 1988-02-04 | 1988-08-04 (6 months added) |
| | Blank and Impute | Method of changing some or all of specific items into blank or substitution letter ("*", "_") | 010-555-2580 | 010-*-** |

DATA ARCHIVING METHOD AND SYSTEM USING HYBRID STORAGE OF DATA

CROSS-REFERENCES TO RELATED APPLICATION

This U.S. non-provisional application is a continuation application of PCT International Application PCT/KR2020/018913, which has an International filing date of Dec. 22, 2020, and claims priority under 35 U.S.C. 119 to Korean Patent Application No. 10-2020-0001413, filed on Jan. 6, 2020, and Korean Patent Application No. 10-2020-0147425, filed on Nov. 6, 2020, in the Korean intellectual property office, the disclosures of which are herein incorporated by reference in its entirety.

BACKGROUND

1. Field of the Invention

The following description relates to a method and system for archiving data using hybrid storage of data.

2. Description of the Related Art

As the reinforcement of data-related regulations, the growth of the medical industry, an increase in the importance of data storage management for a patient, and interests in data management within a company are recently increased, the necessity for research of data archiving is increased. For example, from a viewpoint of data-related regulations, laws regulate that data, such as financial transaction data and medical information, is stored for several years to several tens of years for the protection of consumer rights. Data needs to be stored for a long period due to a variety of types of data-related regulations. Furthermore, in the medical industry field, as the amount of medical image data is increased due to a rise of image diagnosis dependency, the necessity for an archiving system for increased data management, including storage and backup demands for maintenance and management of data, is increased. Furthermore, from a viewpoint of data management within a company, a function for securing and managing important data in terms of security in addition to storing a large amount of data transmitted and received within a company in a server and a real-time recovery and backup task for data stored in the server becomes important. From a viewpoint of the automation of the manufacturing industry, labor-intensive manufacturing industry companies have transferred their factories to low-cost countries, such as China and India. However, with the development of the robot technology, process automation is accelerated by constructing a convergence type robot factory having improved efficiency and quality of production.

As the 4-th industrial revolution arrives, the big data field has been in the spotlight. However, the big data field in Korea is currently concentrated on infra investment, such as servers, storages and networks. It is necessary to expand a development opportunity into the software and service field by distributing investment in infrastructure through the development of the archiving technology in the future. Accordingly, there is an increasing demand for the development of an archiving technology having a high data compression rate, a high compression speed and fast data query compared to the existing technology.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure provide a data archiving method and system, which can process primary archiving capable of rapidly searching for compressed and stored data by compressing and storing, in a table of a database or another database, at least some of data stored in the database included in a target system, and can process secondary archiving for data for which search is no longer requested or for which a search request is low by storing at least some of the data compressed and stored in the table in the form of a file according to a preset condition.

In an aspect, there is provided a data archiving method performed by a computer device including at least one processor, including steps of compressing and storing, by the at least one processor, at least some of data stored in a database included in the target system in a table of the database or another database, and storing, by the at least one processor, at least some of the data compressed and stored in the table in a file form according to a preset condition.

According to an aspect, the preset condition may include at least one of a first condition in which a secondary archiving instruction is received from a manager of the target system, a second condition in which a storage period of the data compressed and stored in the table elapses, a third condition in which a search request for the data compressed and stored in the table does not occur for a preset first period, and a fourth condition in which a search request for the data compressed and stored in the table is equal to or smaller than a preset number for a preset second period.

According to another aspect, the another database may include a database included in an external system of the target system.

According to still another aspect, the step of storing in a file form may include storing the file in a local repository or the target system or a repository included in an external system of the target system.

According to still another aspect, the step of compressing and storing in a table may include steps of determining a partition for a data record included in a target archiving table of the database included in the target system based on selection information of the data record, generating a compression partition by compressing the data record for each partition, associating and storing, in a compression table, the compression partition and a storage key to uniquely identify the compression partition, and associating and storing the storage key and the selection information in an index table of the database or the another database.

According to still another aspect, the step of associating and storing in an index table may include steps of associating and storing the storage key and a given field value in a group index table of the database or the another database when the selection information may include the given field value of a corresponding data record, and associating and storing the storage key and information on time in a period index table of the database or the another database when the selection information may include the information on the time of a corresponding data record.

According to still another aspect, the step of compressing and storing in a table may further include associating and storing, in a key index table of the database or the another database, a primary key, key index information which is a location of a corresponding data record within a compressed compression partition including the corresponding data record, and a storage key corresponding to the compressed compression partition including the corresponding data record with respect to each of data records stored in the target archiving table.

According to still another aspect, the step of associating and storing in a key index table may include searching for a data record having the same primary key as a data record included in the target archiving table, among data records included in a second compression partition, with respect to the second compression partition generated by compressing a data record in a connection table connected to the table through the primary key, and further storing sub-index information which is a location within the second compression partition for the retrieved data record with respect to the data record having the same primary key in the key index table.

According to still another aspect, the step of compressing and storing in the table may further include deleting the compressed data record from the target archiving table.

In an aspect, there is provided a computer program coupled to a computer device and stored in a computer-readable recording medium in order to execute the method in the computer device.

In an aspect, there is provided a computer-readable recording medium on which a program for executing the method in a computer device is recorded.

In an aspect, there is provided a computer device including at least one processor implemented to execute a computer-readable instruction. The at least one processor compresses and stores at least some of data stored in a database included in the target system in a table of the database or another database, and stores at least some of the data compressed and stored in the table in a file form according to a preset condition.

Primary archiving processing capable of rapidly searching for compressed and stored data can be performed by compressing and storing, in a table of a database or another database, at least some of data stored in the database included in a target system. Secondary archiving processing can be performed on data for which search is no longer requested or for which a search request is low by storing at least some of data compressed and stored in a table in the form of a file according to a preset condition.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 11 is a diagram illustrating an example of a structure of an index table having a form in which a period index table and a group index table have been combined in an embodiment of the present disclosure.

FIG. 19 is a diagram illustrating an example of a method of unidentifying data in an embodiment of the present disclosure.

DETAILED DESCRIPTION

Figure 1:
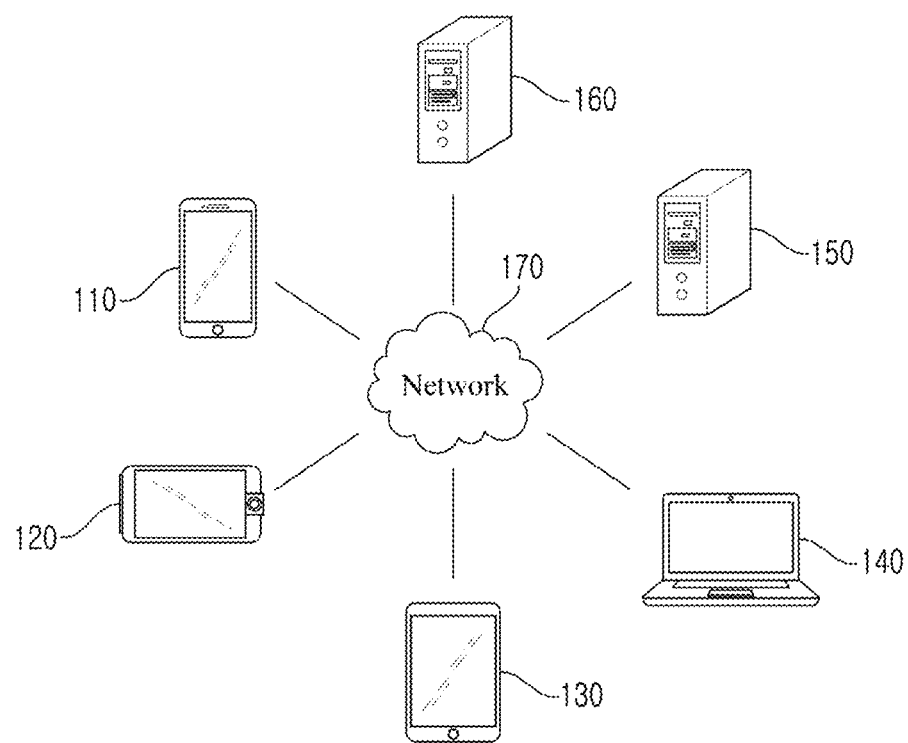
FIG. 1 is a diagram illustrating an example of a network environment according to an embodiment of the present disclosure.

While illustrative embodiments have been illustrated and described, it will be appreciated that various changes can be made therein without departing from the spirit and scope of the invention.

The present disclosure may be changed in various ways and may have various embodiments, and specific embodiments are illustrated in the drawings and described in detail. It is however to be understood that the present disclosure is not intended to be limited to the specific disclosure and that the present disclosure includes all changes, equivalents and substitutions which fall within the spirit and technological scope of the present disclosure. In the drawings, similar elements are assigned similar reference numerals.

Terms, such as a first, a second, A, and B, may be used to describe various elements, but the elements should not be restricted by the terms. The terms are used to only distinguish one element from the other element. For example, a first element may be named a second element without departing from the scope of rights of the present disclosure. Likewise, a second element may be named a first element.

The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present disclosure. An expression of the singular number should be construed as including an expression of the plural number unless clearly defined otherwise in the context. It is to be understood that in this application, a term, such as "include (or comprise)" or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

All terms used herein, including technical terms or scientific terms unless defined otherwise in the specification, have the same meanings as those commonly understood by a person having ordinary skill in the art to which the present disclosure pertains. Terms, such as those commonly used and defined in dictionaries, should be construed as having the same meanings as those in the context of a related technology, and should not be construed as having ideal or excessively formal meanings unless explicitly defined otherwise in the specification.

Hereinafter, embodiments are described in detail with reference to the accompanying drawings.

A data archiving system according to embodiments of the present disclosure may be implemented by at least one computer device. A data archiving method according to embodiments of the present disclosure may be performed through at least one computer device included in the data archiving system. A computer program according to an embodiment of the present disclosure may be installed and driven in the computer device. The computer device may perform the data archiving method according to embodiments of the present disclosure under the control of the driven computer program. The computer program may be coupled to the computer device, and may be stored in a computer-readable recording medium in order to execute the data archiving method in the computer device.

FIG. 1 is a diagram illustrating an example of a network environment according to an embodiment of the present disclosure. FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160, and a network 170. FIG. 1 is an example for a description of an invention, and the number of electronic devices or the number of servers is not limited to FIG. 1. Furthermore, the network environment of FIG. 1 merely describes one of environments which may be applied to the present embodiments, and an environment which may be applied to the present embodiments is not limited to the network environment of FIG. 1.

The plurality of electronic devices 110, 120, 130 and 140 may be stationary devices or mobile devices implemented as computer devices. The plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), and a tablet PC, for example. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but the present disclosure is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides a service (e.g., an archiving service, a file distribution service, a content provision service, a group call service (or a voice conference service), a messaging service, a mail service, a social network service, a map service, a translation service, a financial service, a payment service, and a search service).

Figure 2:
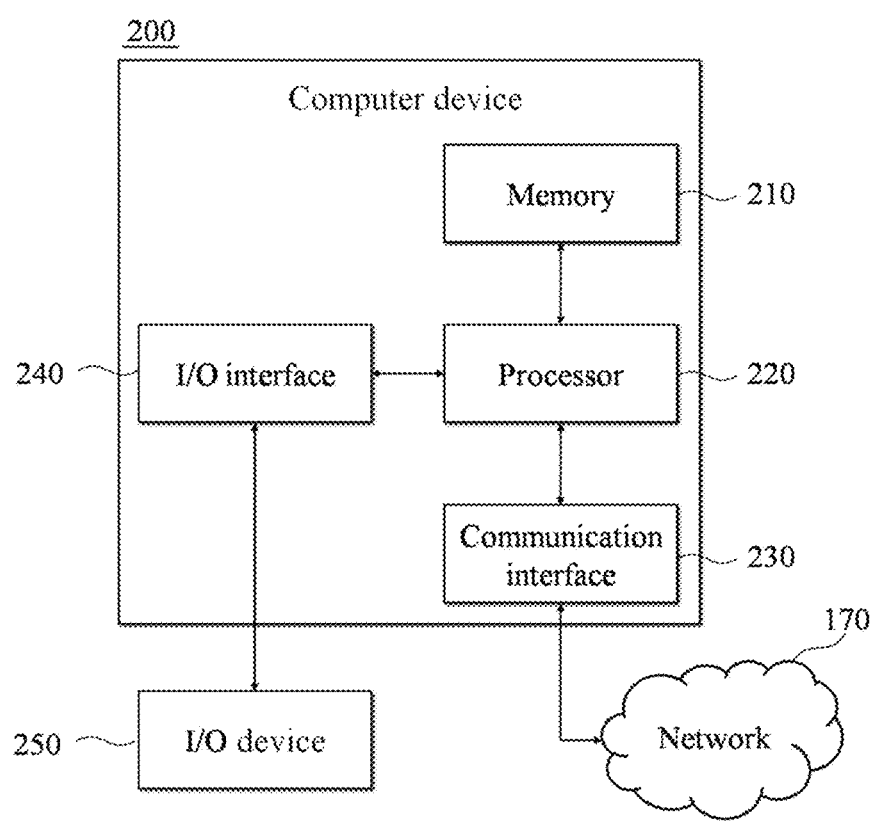
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130 and 140 or each of the servers 150 and 160 may be implemented by a computer device 200 illustrated in FIG. 2.

As illustrated in FIG. 2, the computer device 200 may include a memory 210, a processor 220, a communication interface 230, and an input/output (I/O) interface 240. The memory 210 is a computer-readable medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating system and at least one program code may be stored in the memory 210. Such software components may be loaded from a computer-readable medium, separated from the memory 210, to the memory 210. Such a separate computer-readable medium may include computer-readable recording media, such as a floppy drive, a disk, a tape, a DVD/CD-ROM drive, and a memory card. In another embodiment, software components may be loaded onto the memory 210 through the communication interface 230 not a computer-readable medium. For example, the software components may be loaded onto the memory 210 of the computer device 200 based on a computer program installed by files received over the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute received instructions based on a program code stored in a recording device, such as the memory 210.

The communication interface 230 may provide a function for enabling the computer device 200 to communicate with other devices (e.g., the aforementioned storage devices) over the network 170. For example, a request, an instruction, data or a file generated by the processor 220 of the computer device 200 based on a program code stored in a recording device, such as the memory 210, may be provided to other devices over the network 170 under the control of the communication interface 230. Inversely, a signal, an instruction, data or a file from another device may be received by the computer device 200 through the communication interface 230 of the computer device 200 over the network 170. The signal, instruction or data received through the communication interface 230 may be transmitted to the processor 220 or the memory 210. The file received through the communication interface 230 may be stored in a storage device (i.e., the aforementioned permanent storage device) which may be further included in the computer device 200.

The I/O interface 240 may be means for an interface with an I/O device 250. For example, the input device may include a device, such as a microphone, a keyboard, or a mouse. The output device may include a device, such as a display or a speaker. For another example, the I/O interface 240 may be means for an interface with a device in which functions for input and output have been integrated into one, such as a touch screen. The I/O device 250, together with the computer device 200, may be configured as a single device.

Furthermore, in other embodiments, the computer device 200 may include components greater or smaller than the components of FIG. 2. However, it is not necessary to clearly illustrate most of conventional components. For example, the computer device 200 may be implemented to include at least some of the I/O devices 250 or may further include other components, such as a transceiver and a database.

Figure 3:
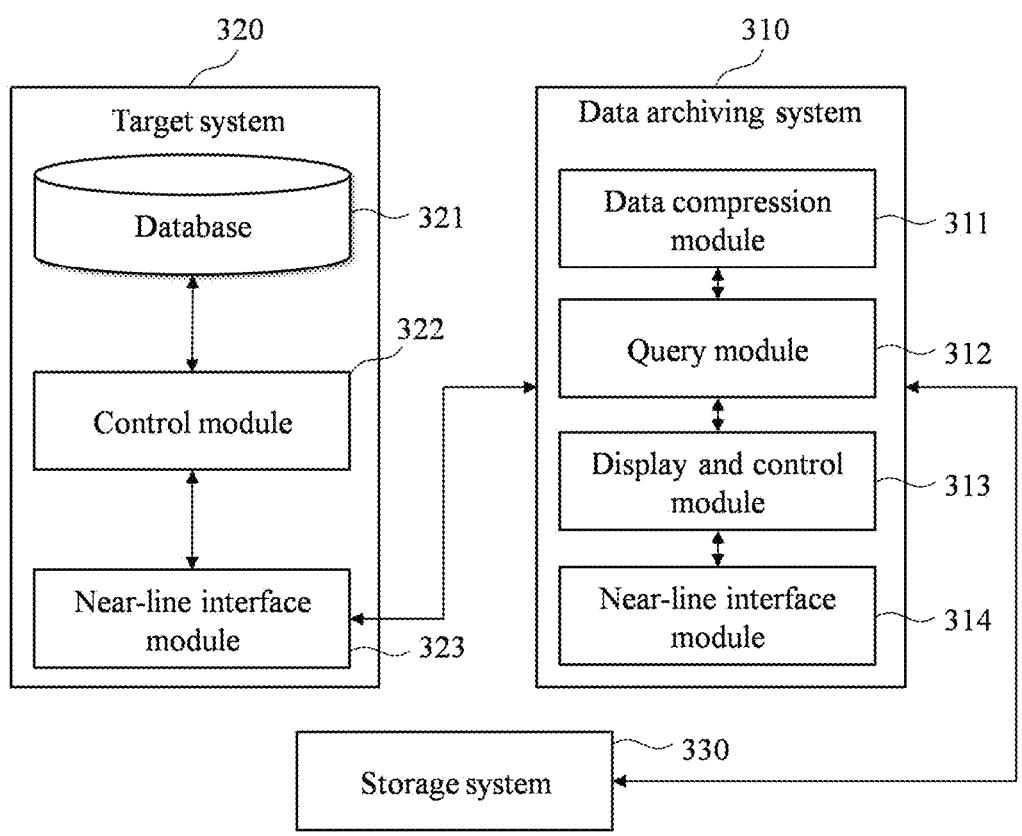
FIG. 3 is a diagram illustrating a general shape of a computer system for archiving in an embodiment of the present disclosure.

FIG. 3 is a diagram illustrating a general shape of a computer system for archiving in an embodiment of the present disclosure.

A data archiving system 310 may be implemented by a physical device, such as the computer device 200 described with reference to FIG. 2, or by the coupling of a plurality of the physical devices. As illustrated in FIG. 3 may include a data compression module 311, a query module 312, a display and control module 313, and a near-line interface module 314. In this case, each of the data compression module 311, the query module 312, the display and control module 313, and the near-line interface module 314 may be a functional expression of operations performed by the processor 220 of the computer device 200 that implements the data archiving system 310 based on a code of an archiving solution program installed in the data archiving system 310. For example, the archiving solution program may include a code for providing a data compression function. The processor 220 may provide the data compression function through such a code. In this case, the "data compression module 311" may be used as a functional expression for an operation(s) for providing the data compression function of the processor 220.

In other words, the data archiving system 310 may be implemented as the archiving solution program is installed and driven in the computer device 200. For example, the archiving solution program may be developed as a cloud software as a service (SaaS) type product, and may be registered with cloud systems of various cloud vendors. Thereafter, the archiving solution program may provide functions for archiving to a target system 320 to be described later. For another example, the data archiving system 310 may be implemented in the form of an appliance server in which a remote near-line data archiving technology (e.g., an archiving solution program) and hardware are integrated. In the case of the appliance server, fast delivery and maintenance and repair are easy due to a product form, thereby being capable of maintaining consistent product quality and providing price competitiveness.

The target system 320 may also be implemented by a physical device, such as the computer device 200 described with reference to FIG. 2, or by the coupling of a plurality of the physical devices. As illustrated in FIG. 3, the target system 320 may include a database 321, a control module 322 and a near-line interface module 323. In this case, each of the control module 322 and the near-line interface module 323 may be a functional expression of operations performed by the processor 220 of the computer device 200 that implements the target system 320.

The data archiving system 310 and the target system 320 may communicate with each other over a network (e.g., the network 170 described with reference to FIGS. 1 and 2). The target system 320 may invoke a function provided by the data archiving system 310 through the near-line interface module 323 under the control of the control module 322. In this case, the data archiving system 310 may provide the target system 320 with a function invoked by the target system 320. For example, the target system 320 may be an integrated information system for enterprise resource planning (ERP). The near-line interface module 323 may be based on a remote function call (RFC) for SAP ERP, for example.

Figure 4:
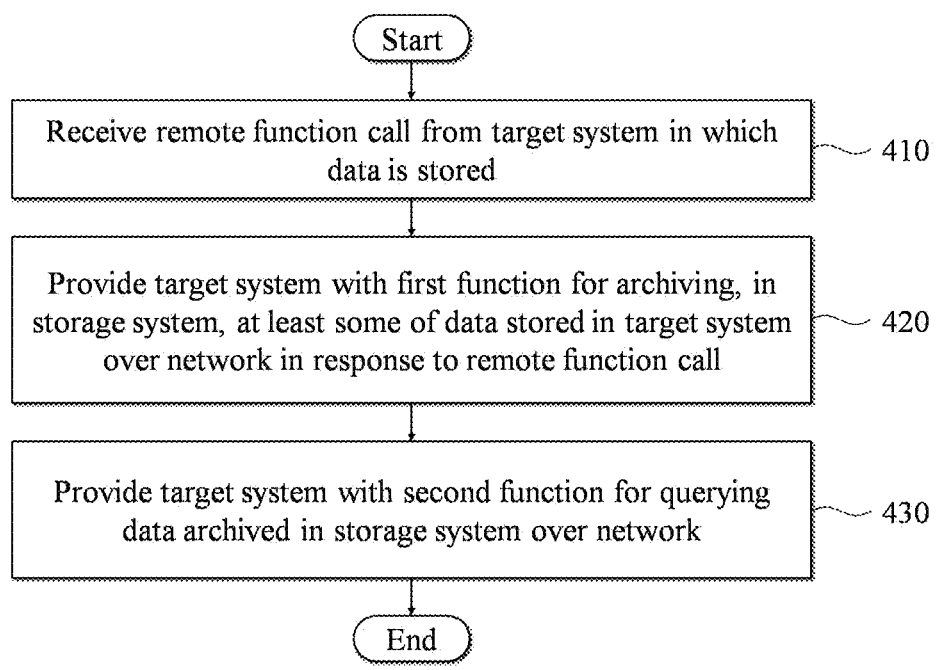
FIG. 4 is a flowchart illustrating an example of a data archiving method according to an embodiment of the present disclosure.

FIG. 4 is a flowchart illustrating an example of a data archiving method according to an embodiment of the present disclosure. The data archiving method according to the present embodiment may be performed by the computer device 200 that implements the data archiving system 310. In this case, the processor 220 of the computer device 200 may be implemented to execute a control instruction according to a code of an operating system or a code of at least one computer program included in the memory 210. In this case, the processor 220 may control the computer device 200 to execute steps 410 to 440 included in the method of FIG. 4 based on a control instruction provided by a code stored in the computer device 200. Furthermore, the computer program may correspond to the aforementioned archiving solution program.

In step 410, the computer device 200 may receive a remote function call from a target system in which data is stored. In this case, the target system may correspond to the target system 320 described with reference to FIG. 3. The remote function call may be generated through the near-line interface module 323 of the target system 320.

In step 420, the computer device 200 may provide the target system with a first function for archiving, in a storage system, at least some of data stored in the target system over a network in response to the remote function call.

For example, referring back to FIG. 3, the data archiving system 310 may provide the target system 320 with the first function for archiving, in a storage system 330, at least some of data stored in the database 321 of the target system 320 over a network in response to the invoking of the target system 320.

In this case, in some embodiments, the storage system 330 may be a local database (e.g., the database 321) included in the target system 320, may be an external database of the target system 320 and/or may be a repository included in an external system (e.g., a file server or a cloud server) of the target system 320.

For example, the data archiving system 310 may provide, as the first function, a function for compressing at least some of data stored in the database 321 of the target system 320 and archiving the compressed data in a table of the database 321. In this case, an archiving speed is fast and a data query speed can also be improved because the compressed data is not stored in the form of a file, but is stored in a table of the database 321 of the target system 320.

For another example, the data archiving system 310 may provide, as the first function, a function for compressing at least some of data stored in the database 321 of the target system 320 and archiving the compressed data in a table of an external database of the target system 320. For example, from a viewpoint of the data archiving system 310, assuming that the target system 320 is a cloud, the data archiving system 310 may store the compressed data in a table of a database included in another cloud.

Furthermore, for example, the data archiving system 310 may provide, as the first function, a function for compressing at least some of data stored in the database 321 of the target system 320 in the form of a file and archiving the compressed data in a repository included in an external system of the target system 320. For example, if the data archiving system 310 has been implemented within a cloud system, the data archiving system 310 may store the file including the compressed data in the repository of the cloud system.

As a more detailed example, the data archiving system 310 may provide a user interface for providing the target system 320 with functions, such as retention cycle management, archiving configuration, archiving execution, monitoring, data query and data management for an archiving service, through the display and control module 313.

In this case, when the execution of archiving is requested through the user interface provided through the display and control module 313, the data archiving system 310 may provide the target system 320 with the first function for archiving, in the storage system 330, at least some of data stored in the database 321 of the target system 320 based on an archiving configuration configured through the data compression module 311. In other words, the target system 320 may archive, in the storage system 330, at least some of data stored in the database 321 by using the first function provided by the data archiving system 310.

In step 430, the computer device 200 may provide the target system with a second function for querying data archived in the storage system over the network. Such a second function may also be provided by a remote function call from the target system.

For example, referring back to FIG. 3, the data archiving system 310 may provide the target system 320 with the second function for querying data archived in the storage system 330 over a network in response to the invoking of the target system 320.

When a data query is requested through the user interface provided through the display and control module 313, the data archiving system 310 may provide the target system 320 with the second function for querying data archived in the storage system 330 through the query module 312. In other words, the target system 320 may query data archived in the storage system 330 by using the second function provided by the data archiving system 310.

As described above, the target system 320 may archive data stored in the database 321 by using functions provided by the data archiving system 310 without a need to add separate hardware.

As described above, the first function provided by the data archiving system 310 may include a function for storing compressed data by storing the compressed data in a table of a database (e.g., the database 321 or external database of the target system 320) or storing the compressed data in the form of a file. In this case, the data archiving system 310 may manage a data lifespan cycle because archive data compressed and stored in a table of the database also causes an increase in the volume of the database as data. For example, the data archiving system 310 may manage the data lifespan cycle according to a procedure a "database a data compression archive a file archive a archive product." In this case, the "database" may mean that data is managed in the state in which the data has been stored in the database 321 of the target system 320. Furthermore, the "data compression archive" may mean that data is managed in the state in which the data has been compressed in a table of a database (e.g., the database 321 or external database of the target system 320). Furthermore, the "file archive" may mean that data managed in a state compressed in a table of a database is achieved and stored as a file when the storage period of the compression data elapses. The "archive product" may mean that data no longer necessary to be stored among data archived as a file is deleted.

The "file archive" may be performed in the repository of the target system 320, but may also be performed in the repository of an external system of the target system 320. As a more detailed example, the data archiving system 310 may access the target system 320 from which a compression target has been extracted in order to transmit archive data to a cloud system outside the target system 320. In this case, the data archiving system 310 may invoke the target system through the near-line interface module 314. Such invoking may be based on an API call. The data archiving system 310 may be implemented to be connected to various types of storages, such as a database, a disk, a file, an in-memory, a quantum memory, NoSQL, a graph-DB, and a blockchain database, because compressed data may have been stored in various types of storages. The data archiving system 310 may define transmission scenarios depending on business types, such as finance, a cost, production, sales, materials, quality, and systems. In some embodiments, the data archiving system 310 may generate a small group of transmission scenarios by considering a network bandwidth. Furthermore, the data archiving system 310 may allocate an object to a transmission scenario. If small groups of transmission scenarios are present, the data archiving system 310 may allocate an extracted object to the small groups of transmission scenarios. Furthermore, the data archiving system 310 may convert the extracted object into a binary object, and may construct a present transmission band condition table for the capacity and quantity of an object for each transmission scenario and/or for each small group. Furthermore, the data archiving system 310 may perform transmission simulations. In this case, the data archiving system 310 may select a simulation target for each transmission scenario and/or for each small group, may execute transmission simulations, and may check a transmission time for each object. Thereafter, the data archiving system 310 may predict an optimum time in the transmission for each object data ratio. After the transmission simulations, the data archiving system 310 may execute actual data transmission by using scenario information, small group information and/or object information. In this case, the data archiving system 310 may optimize a total end time by arranging small groups and/or objects that require less time on the basis of a small group and/or an object that requires the longest transmission time based on transmission simulation information. In this case, the data archiving system 310 may separately store data storage locations for each data character, and may check the number of transmission cases and an execution time in real time through a transmission condition monitoring tool. Furthermore, the data archiving system 310 may update a transmission execution map with an extraction progress condition, and can maintain the speed and integrity by performing the transmission of data from a sequence after completion when an error occurs. The transmission of data may be performed using a streaming method or object unit transmission. Furthermore, after checking whether the transmission of data from the target system 320 to the storage system 330 for each scenario and/or each small group has been completed, the data archiving system 310 may verify a process of transmitting archive data by comparing an object capacity and a current quantity condition table and transmitted data for each transmission scenario and/or for each small group. In this case, the data may be transmitted according to a 1:1 relation or may be transmitted to different servers having a 1:N relation simultaneously. In this case, a present transmission band condition table may be configured for each server.

Figure 5:
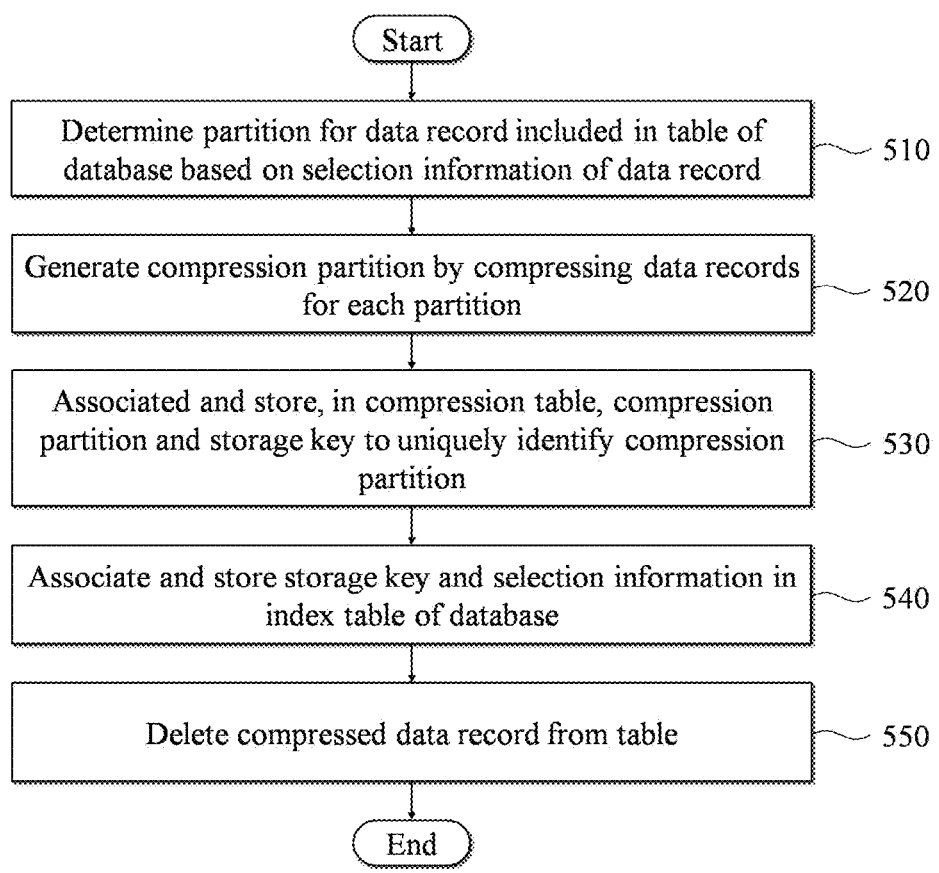
FIG. 5 is a flowchart illustrating an example of a process of archiving data by using a first function in an embodiment of the present disclosure.

FIG. 5 is a flowchart illustrating an example of a process of archiving data by using the first function in an embodiment of the present disclosure. The process according to the present embodiment may be performed by the computer device 200 that implements the target system 320 by using the first function provided by the data archiving system 310. In this case, the processor 220 of the computer device 200 may be implemented to execute a control instruction according to a code of an operating system or a code of at least one computer program included in the memory 210. In this case, the processor 220 may control the computer device 200 to execute steps 510 to 550 included in the method of FIG. 5 based on the control instruction provided by the code stored in the computer device 200. In this case, the code may include a code for the first function provided by the data archiving system 310.

In step 510, the computer device 200 may determine a partition for a data record included in a table of a database (i.e., a target archiving table) based on selection information of the data record. In this case, the database may correspond to the database 321 of the target system 320 described with reference to FIG. 3. The selection information may include information on time of the data record and/or a given field value of the data record. The computer device 200 may determine the partition for the data record based on the information on time and/or the field value. A table is a unit that constitutes a basic structure in which data is stored in the database. The table described in step 510 may be a target archiving table to be archived in order to reduce a capacity among a plurality of tables included in the database.

For example, the computer device 200 may select, as one partition, data records each having a field value within a given range. In this case, the field value may be determined as a field value of a field that is most frequently searched in a table. The reason for this is that when archived data is subsequently searched for, efficiency of search can be maximized using index information generated based on a corresponding field value. For another example, the computer device may select, as one partition, data records having information on time within a given range.

Furthermore, the partition may consist of a set of data records selected among all data records included in a table. At least one partition may be generated. A partition may be generated with respect to only some data records not the entire table, if necessary. For example, a partition for archiving may be generated with respect to only data records prior to the year 2015 except data records after the year 2015 in a table.

The number of data records included in one partition may be determined by comprehensively analyzing and reviewing a total number of records included in a table, performance of a computer that searches a database, a search condition having high frequency in a database, etc.

In another embodiment, if an excess partition having data records exceeding a threshold value is present in selected partitions, the excess partition may be separated into a plurality of partitions each having data records equal to or smaller than a threshold value. For example, a threshold value, that is, the number of data records which may be included in one partition, may be set to 100,000. However, if a selected partition includes data records greater than the threshold value, this may be problematic because overload and inefficiency of a computer may be caused. Accordingly, if one partition has data records greater than 100,000, several partitions may be generated by separating the one partition into a plurality of partitions in a 100,000 unit. For example, if one partition has 250,000 data records, the computer device 200 may separate the excess partition into a total of three partitions, including two partitions each having 100,000 data records and a partition having 50,000 data records.

Since the plurality of partitions separated as described above has been separated according to a classification criterion based on the same field value, there may be no method of distinguishing between the plurality of partitions. Accordingly, serial numbers (e.g., 1, 2, 3, 4, etc.) may be assigned to a plurality of record groups, respectively, and the plurality of record groups may be further stored in a serial number field of an index table. In this case, even when archived data is searched for, the search may be performed by distinguishing between the plurality of separated partitions. Such a serial number may correspond to a sequence to be described later.

In step 520, the computer device 200 may generate a compression partition by compressing data records for each partition. For example, the computer device 200 may generate a compression partition by compressing, into a binary object, the data record included in the determined partition.

For example, in order to generate the compression partition, the computer device 200 may first store, in a buffer, the data record to be included in the compression partition. The size of the buffer in which the data record is stored may be determined based on a structure (e.g., the number, type and size of a field) of a table and a threshold value of the data record to be included in the compression partition. For example, if the table includes a total of three fields of DATE (8 letters), NAME (30 letters) and AGE (integer of 4 bytes) and a threshold value of the number of data records included in the compression partition is 100,000, when one letter is calculated as two bytes, the size of the buffer may be at least 100,000*(8*2+30*2+4)=8,000,000 bytes (about 8 megabyte). In this case, the computer device 200 may sequentially read a data record included in the compression partition and a field value of the data record and sequentially store all of the data records and the field values in the buffer.

Thereafter, the computer device 200 may generate a compression partition by compressing the data stored in the buffer. The compression partition may be output having a binary object form generated by compressing the data stored in the buffer. In this case, in order for a loss attributable to the compression to not occur, ZIP, CTW, LZ77, LZW, gzip, bzip2, DEFLATE, etc., that is, lossless compression algorithms, may be used.

In this case, the computer device 200 may generate a storage key uniquely assigned to each generated compression partition.

In step 530, the computer device 200 may associated and store, in a compression table, the compression partition and a storage key to uniquely identify the compression partition. As described above, compressed data may be stored in a table of the database 321 of the target system 320 or a table of an external database of the target system 320. The compression table may include a field for storing a compression partition compressed and generated for each partition and a field for storing a storage key uniquely assigned to correspond to the corresponding compression partition. The storage key is a key including a value uniquely assigned to each compression partition. A value of a storage key shared for each compression partition may be stored in a field of a compression table corresponding to the storage key. Furthermore, the number of fields corresponding to a storage key may be one or more. When values of storage keys distributed and stored in one or more fields are combined, the fields may be implemented so that a unique storage key is formed for each compression partition.

In step 540, the computer device 200 may associate and store the storage key and the selection information in the index table of the database. For example, if selection information includes a given field value of a corresponding data record, the computer device 200 may associate and store a storage key and the given field value in a group index table in step 440. The storage key and the field value stored in the group index table may be used as an index for searching for a compressed and stored data record according to a search condition including the given field value. For another example, if selection information includes information on time of a data record, the computer device 200 may associate and store a storage key and the information on time in a period index table. The storage key and the information on time, stored in the period index table, may be used as an index for searching for a compressed and stored data record according to a search condition including information on a given time. In other words, an index table including a group index table and/or a period index table may be used to obtain a field value included in a search condition and/or a storage key corresponding to information on time. The storage key may be used to obtain a compression partition corresponding to a storage key in a compression table.

In step 550, the computer device 200 may delete the compressed data record from the table. An object of compressing and archiving a database is to reduce the storage space of the database. To this end, the computer device 200 can reduce the storage space of the database by deleting archived data records from the table. However, in some embodiments, a compressed data record may not be immediately deleted from a table, and may be deleted from the table after a specific period elapses.

A deleted data record may be subsequently restored as a corresponding table. For example, the computer device 200 may search an index table for a storage key associated with identification information included in a restoration request in response to the restoration request for a deleted data record, and may search a compression table for a compression partition associated with the retrieved storage key. Thereafter, the computer device 200 may restore the deleted data record by decompressing the retrieved compression partition, and may record the restored data record in a table based on the identification information. In this case, in order to identify a specific data record for which restoration has been requested among data records included in the compression partition, information of a key index table to be described later may be used.

Steps 510 to 550 may be performed using the first function provided by the data archiving system 310. In other words, the data archiving system 310 may provide the first function including a function for controlling the target system 320 to perform steps 510 to 550.

Figure 6:
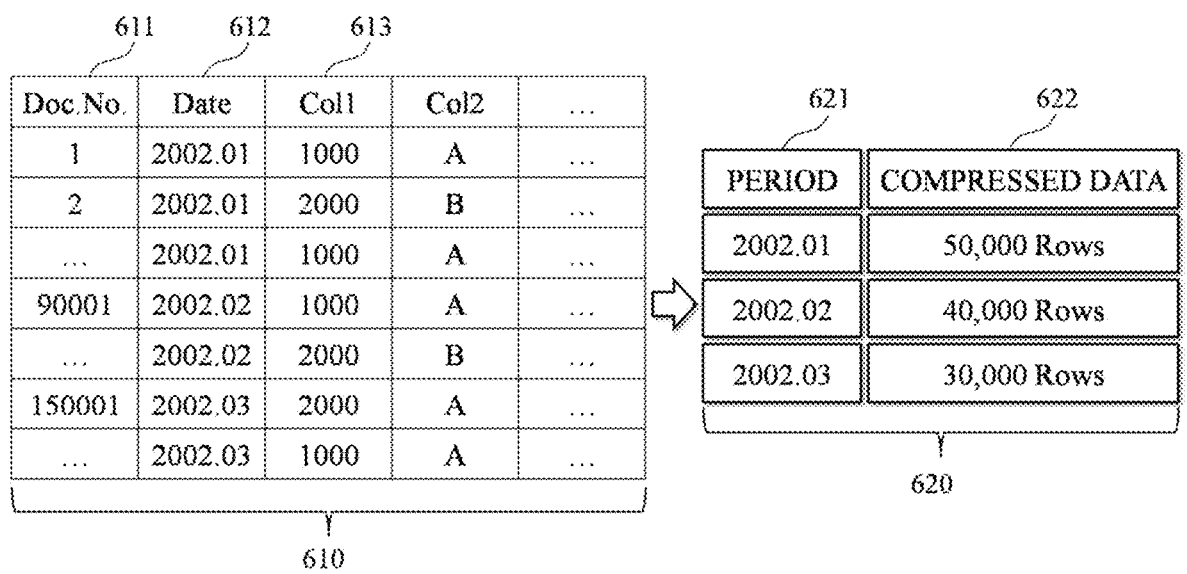
FIG. 6 is a diagram illustrating a first example of a structure of a compression table according to an embodiment of the present disclosure.

FIG. 6 is a diagram illustrating a first example of a structure of a compression table according to an embodiment of the present disclosure. A table 610 in FIG. 6 includes a Doc.No. field 611, a Date field 612 for time, and a Col1 field 613 for a specific attribute. In this case, the computer device 200 may generate a compression partition by classifying and compressing data records of the table 610 based on a field value of the Date field 612, that is, information on time, as selection information or a field value of the Col1 field 613 in the table 610. In this case, the computer device 200 may generate a compression table 620 by associating and storing the compression partition and a storage key for uniquely identifying the compression partition. For example, the compression table 620 according to the embodiment of FIG. 6 may include OBJECT ID field 621 having the storage key as a field value and a COMPRESSED DATA field 622 having the compression partition as a field value.

Figure 7:
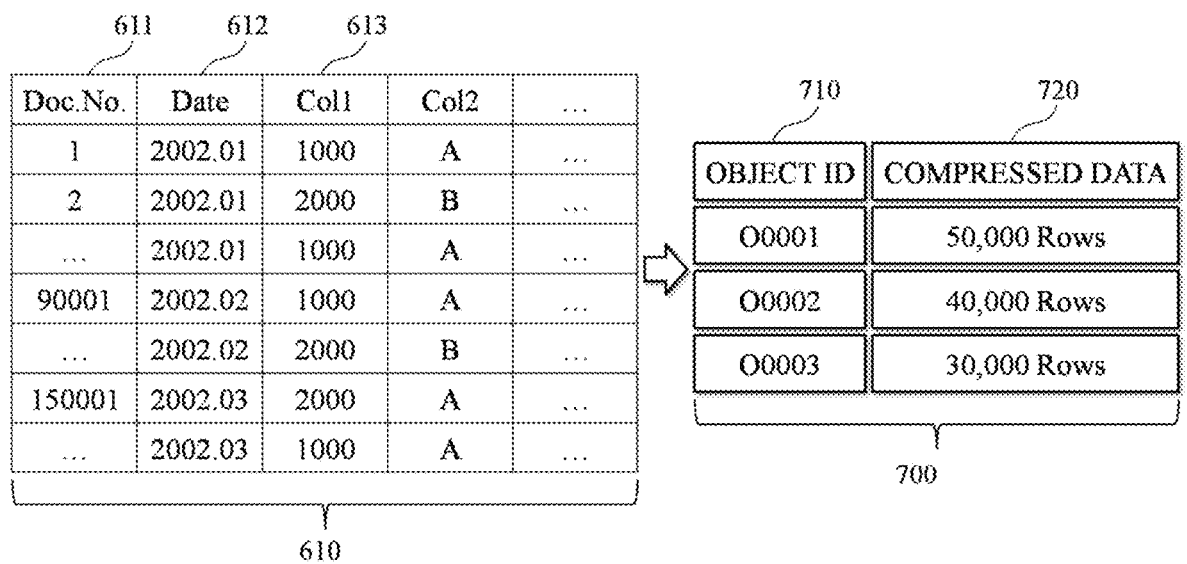
FIG. 7 is a diagram illustrating a second example of a structure of a compression table according to an embodiment of the present disclosure.
Figure 8:
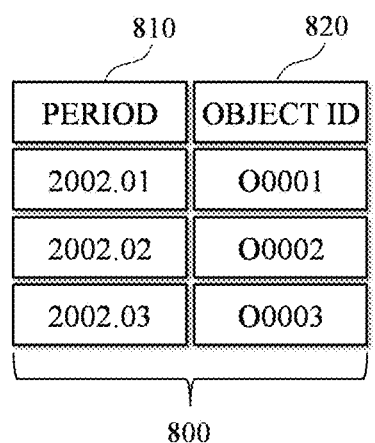
FIG. 8 is a diagram illustrating an example of a structure of a period index table according to an embodiment of the present disclosure.
Figure 9:
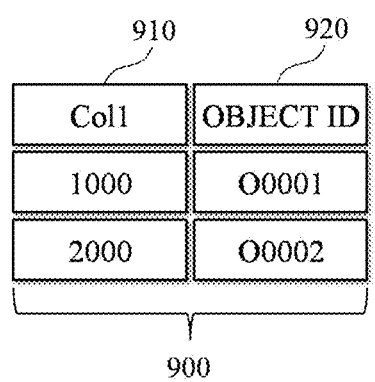
FIG. 9 is a diagram illustrating an example of a structure of a group index table according to an embodiment of the present disclosure.

FIG. 7 is a diagram illustrating a second example of a structure of a compression table according to an embodiment of the present disclosure, FIG. 8 is a diagram illustrating an example of a structure of a period index table according to an embodiment of the present disclosure. FIG. 9 is a diagram illustrating an example of a structure of a group index table according to an embodiment of the present disclosure.

FIG. 7 describes another embodiment in which a compression table 700 is generated through the table 610 described with reference to FIG. 6. For example, the computer device 200 may generate a compression partition by classifying and compressing data records of the table 610 based on a field value of the Date field 612, that is, information on time as selection information, in the table 610. Furthermore, the computer device 200 may generate the compression table 700 by associating and storing the selection information and the corresponding compression partition. For example, the compression table 700 according to the embodiment of FIG. 7 may include a PERIOD field 710 having information on time as a field value and a COMPRESSED DATA field 720 having a compression partition as a field value.

FIG. 8 illustrates an example of a period index table 800 which may be generated and used if the compression table 700 includes a compression partition generated by classifying and compressing data records based on a field value (information on time) of the Date field 612. In this case, the period index table 800 may include a PERIOD field 810 having information on time as a field value and an OBJECT ID field 820 having a storage key as a field value. For example, when receiving a search condition including information on time (e.g., "2020.01") as selection information, the computer device 200 may search the period index table 800 for a corresponding storage key (e.g., a storage key "00001" corresponding to the information on time "2020.01" in the period index table 800) by using the information on time included in the search condition, and may search the compression table 620 for a compression partition corresponding to the storage key (e.g., a compression partition of "50,000 Rows" corresponding to the storage key "00001" in the compression table 620) by using the retrieved storage key.

Furthermore, FIG. 9 illustrates an example of a group index table 900 which may be generated and used if the compression table 600 includes a compression partition generated by classifying and compressing data records based on a field value of the Col1 field 613. In this case, the group index table 900 may include a PERIOD field 910 having a field value of the Col1 field 613 as its own field value and an OBJECT ID field 920 having a storage key as a field value. For example, when receiving a search condition including a field value (e.g., "1000") of the Col1 field 613 as selection information, the computer device 200 may search the group index table 900 for a corresponding storage key (e.g., a storage key "00001" corresponding to the field value "1000" in the group index table 900) by using the field value included in the search condition, and may search the compression table 600 for a compression partition corresponding to the storage key (e.g., a compression partition of "50,000 Rows" corresponding to the storage key "00001" in the compression table 600) by using the retrieved storage key.

Figure 10:
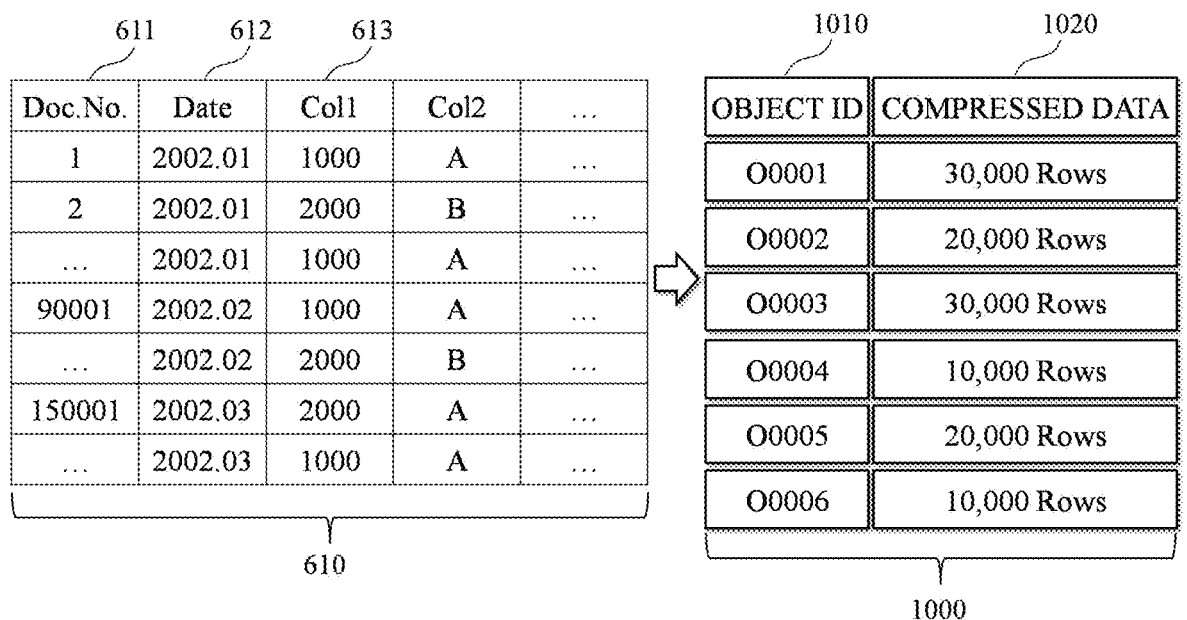
FIG. 10 is a diagram illustrating a second example of a structure of a compression table according to an embodiment of the present disclosure.

FIG. 10 is a diagram illustrating a second example of a structure of a compression table according to an embodiment of the present disclosure. FIG. 11 is a diagram illustrating an example of a structure of an index table having a form in which a period index table and a group index table have been combined in an embodiment of the present disclosure.

FIG. 10 describes another embodiment in which a compression table 1000 is generated through the table 610 described with reference to FIG. 6. For example, the computer device 200 may generate a compression partition by classifying and compressing data records of the table 610 based on two field values, including a field value of the Date field 612, that is, information on time, and a field value of the Col1 field 613 in the table 610.

As a more detailed example, the computer device 200 may generate a first compression partition by compressing a data record in which a field value of the Date field 612 is "2002.01" and a field value of the Col1 field 613 is "1000", a second compression partition by compressing a data record in which a field value of the Date field 612 is "2002.01" and a field value of the Col1 field 613 is "2000", a third compression partition by compressing a data record in which a field value of the Date field 612 is "2002.02" and a field value of the Col1 field 613 is "1000", a fourth compression partition by compressing a data record in which a field value of the Date field 612 is "2002.02" and a field value of the Col1 field 613 is "2000", a fifth compression partition by compressing a data record in which a field value of the Date field 612 is "2002.03" and a field value of the Col1 field 613 is "1000", and a sixth compression partition by compressing a data record in which a field value of the Date field 612 is "2002.03" and a field value of the Col1 field 613 is "2000."

In this case, the computer device 200 may generate a compression table 1000 by associating and storing a corresponding compression partition and a storage key for uniquely identifying the compression partition. For example, the compression table 1000 according to the embodiment of FIG. 10 may include an OBJECT ID field 1010 having a storage key as a field value and a COMPRESSED DATA field 1020 having a compression partition as a field value.

FIG. 11 illustrates an example of an index table 1100 having a form in which a period index table and a group index table have been combined. In this case, the index table 1100 may include a PERIOD field 1110 having information on time as a field value, a PERIOD field 1110 having a field value of the Col1 field 613 as its own field value, and an OBJECT ID field 1130 having a storage key as a field value. For example, when receiving a search condition including information on time (e.g., "2020.02") and a field value (e.g., "1000") of the Col1 field 613 as selection information, the computer device 200 may search the index table 1100 for a storage key (e.g., a storage key "00003" in the index table 1100) that satisfies both the information on time and the field value included in the search condition, and may search the compression table 1000 for a compression partition corresponding to the storage key (e.g., a compression partition of "30,000 Rows" corresponding to the storage key "00003" in the compression table 1000) by using the retrieved storage key.

Figure 12:
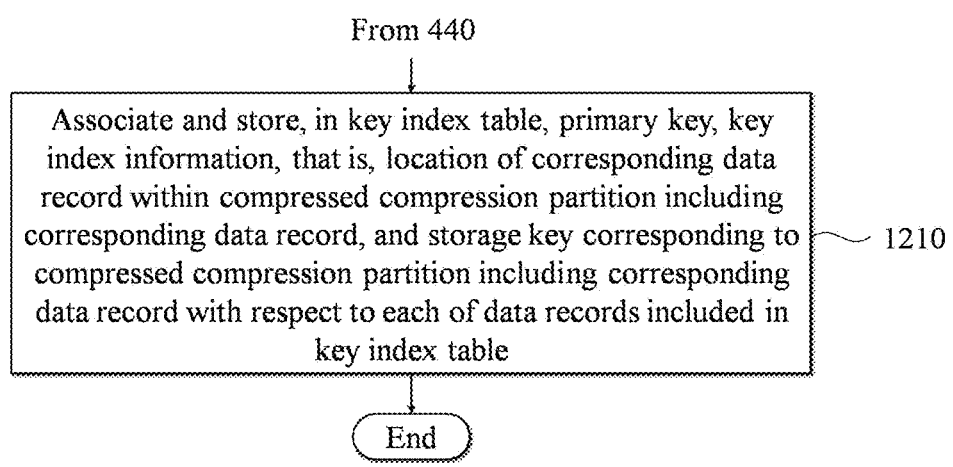
FIG. 12 is a flowchart illustrating another example of a process of archiving data by using the first function in an embodiment of the present disclosure.

FIG. 12 is a flowchart illustrating another example of a process of archiving data by using the first function in an embodiment of the present disclosure. The process according to the present embodiment may further include step 1210 after step 540 described with reference to FIG. 5.

In step 1210, the computer device 200 may associate and store, in a key index table, a primary key, key index information, that is, a location of a corresponding data record within a compressed compression partition including the corresponding data record, and a storage key corresponding to the compressed compression partition including the corresponding data record with respect to each of data records included in the key index table. Such step 1210 may be performed using the first function provided by the data archiving system 310. In other words, the data archiving system 310 may provide the first function including a function for controlling the target system 320 to perform step 1210.

The primary key may mean a corresponding value in a field having a value uniquely identified for each record in a database, and may also be called a basic key, a main key or a unique key. Furthermore, one or more primary keys may be present in one table. Furthermore, the key index information is information on where a data record having a value of a specific primary key is stored within a compression partition. For example, information on a storage sequence called a data record stored at a 1000-th place among pieces of information on 100,000 data records included in a compression partition may be stored as key index information.

The reason why the primary key is stored in the key index table is for directly searching a table, that is, a search target, based on the primary key in addition to another field value and information on time. That is, when a user enters a specific primary key and also tries to search a table for a data record having a corresponding primary key, a key index table may be used. More specifically, the computer device 200 may search the key index table for key index information of a data record having the specific primary key and a storage key. In this case, the computer device 200 may obtain a compression partition corresponding to the storage key in a compression table by using the obtained storage key, and may search for a specific data record requested by the user in the compression partition by using the key index information. As described above, such key index information in a key index table may also be used to identify a data record having a specific condition, among data records included in a compression partition, in restoring the data record having the specific condition in a table.

Figure 13:
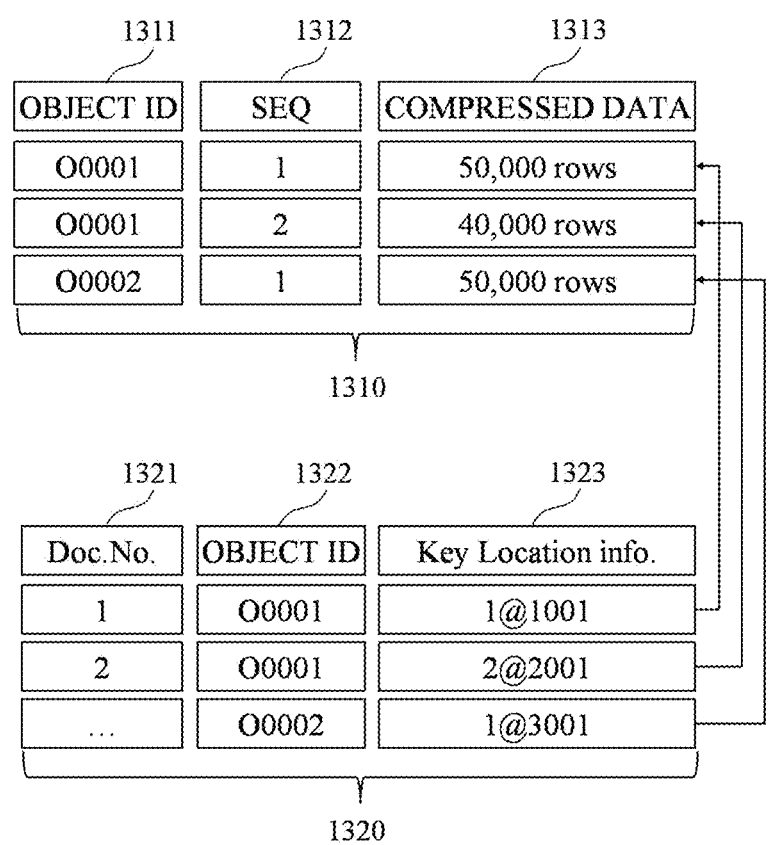
FIG. 13 is a diagram illustrating an example of a structure of a compression table and a key index table according to an embodiment of the present disclosure.

FIG. 13 is a diagram illustrating an example of a structure of a compression table and a key index table according to an embodiment of the present disclosure.

A compression table 1310 may include an OBJECT ID field 1311 having a storage key as a field value, an SEQ field 1312 having a processing sequence in a target table as a field value, and a COMPRESSED DATA field 1313 having a compression partition as a field value. The sequence may define a processing sequence in which a parent table and a child table are present, the parent table is first extracted and the child table is then processed using the extracted parent table.

The key index table 1320, as described above, may include a Doc.No. field 1321 having a primary key as a field value, an OBJECT ID field 1322 having a storage key as a field value, and a Key Location info. field 1323 having key index information as a field value. For example, in key index information 1 @1001, "1" ahead of "@" may indicate a sequence corresponding to a field value in the SEQ field 1312, and "1001" behind "@" may indicate a 1,001-th data record among data records included in a corresponding compression partition. As a more detailed example, the first record in the key index table 1320 may indicate that a data record having a primary key of "1" has been included as a 1,001-th data record among data records of a compression partition in which a storage key is "00001" and a sequence is "1." Likewise, the second record in the key index table 1320 may indicate that a data record having a primary key of "2" has been included as a 2,001-th data record among data records of a compression partition in which a storage key is "00001" and a sequence is "2".

As described above, the key index information may include information on a location of a specific data record within a compression partition. The number of data records to be searched for according to a search condition of a user can be reduced using a key index table (e.g., the key index table 1320 of FIG. 13) including such key index information, a primary key and a storage key.

In another embodiment, the computer device 200 may search for a data record having the same primary key as a data record included in a first table, among data records included in a second compression partition, with respect to the second compression partition generated by compressing a data record in a connection table connected to the first table (e.g., the table described in step 410) through a primary key, and may further store sub-index information, that is, a location within the second compression partition, in the data record having the same primary key in a key index table with respect to the retrieved data record. The connection table is a table connected to the first table through the primary key. That is, the primary key may be present in both the first table and the connection table. The second compression partition may be data generated by compressing a data record in a corresponding connection table when the connection table is connected to the first table through the primary key is present. In this case, the second compression partition may be generated using the same manner as the compression partition described with reference to FIG. 4. Like the compression partition, the second compression partition may be stored in a compression table along with a unique storage key. The sub-index information is information on where a data record having a specific primary key is stored within the second compression partition. For example, information on a storage sequence called a data record stored at a 1000-th place among pieces of information on 100,000 data records included in a second compression partition may be stored as sub-index information. For example, when a connection table connected to a first table through a primary key is present in a database, with respect to a field not present in the first table, but present in the connection table, a user may require field value information of the field. In this case, the computer device 200 may further store sub-index information for a data record having the same primary key in a key index table so that the connection table can also be subsequently searched.

In still another embodiment, if multiple connection tables for a first table are present, the computer device 200 may collect and compress pieces of sub-index information for respective connection tables, and may then store the pieces of sub-index information in a key index table as new sub-index information. For example, the computer device 200 may collect all of pieces of sub-index information for locations within two or more second compression partitions with respect to a data record having the same primary key in a connection table, may compress collected values, and may store, as new sub-index information, the compressed values in a data record including a value of the same primary key in a key index table.

Figure 14:
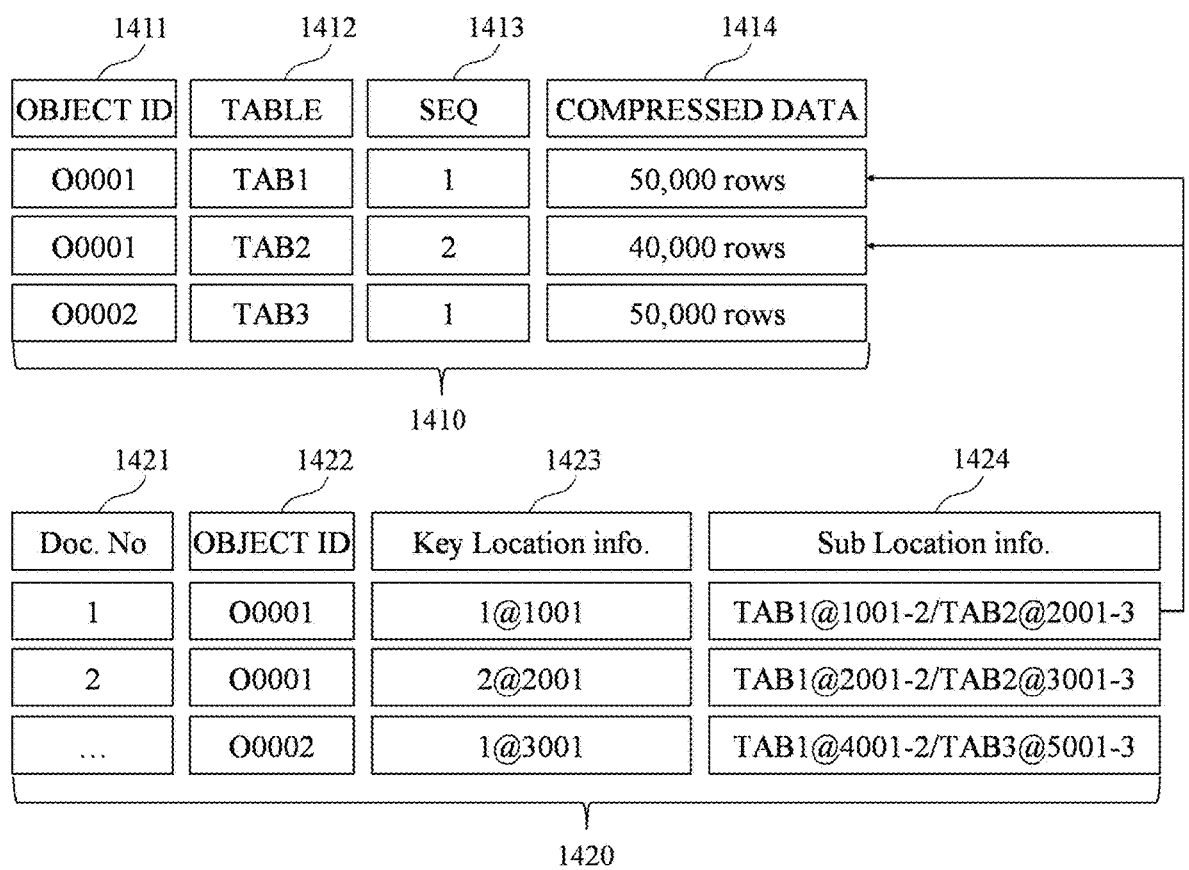
FIG. 14 is a diagram illustrating another example of a structure of a compression table and a key index table according to an embodiment of the present disclosure.

FIG. 14 is a diagram illustrating another example of a structure of a compression table and a key index table according to an embodiment of the present disclosure.

A compression table 1410 may include an OBJECT ID field 1411 having a storage key as a field value, a TABLE field 1412 having an identifier of the table as a field value, an SEQ field 1413 having a sequence as a field value, and a COMPRESSED DATA field 1414 having a compression partition as a field value. The TABLE field 1412 may include an identifier of the table as a field value. In which table a corresponding compression partition includes extracted data records may be identified based on the identifier.

A key index table 1420 according to the present embodiment may include a Doc.No. field 1421 having a primary key as a field value, an OBJECT ID field 1422 having a storage key as a field value, a Key Location info. field 1423 having key index information as a field value, and a Sub Location info. field 1424 having sub-index information as a field value.

For example, the first record in the key index table 1420 may indicate that a data record having a primary key of "1" has been included as a 10,001-th data record among data records of a compression partition in which a storage key is "00001" and a sequence is "1." In this case, a field value "TAB1@1001-2/TAB2@2001-3" in the Sub Location info. field 1424 indicates a location within a second compression partition generated with respect to a connection table of the data record having the primary key of "1." For example, in the field value "TAB1@1001-2/TAB2@2001-3", "TAB1" and "TAB2" ahead of "@" may mean connection tables connected through the same primary key. "1001-2" behind "@" indicates two data records (i.e., a 1,001-th data record (e.g., the first data record) and a 1,002-th data record (e.g., the second data record)) from the 1,001-th data record among data records included in the second compression partition for the connection table "TAB1." Furthermore, "2001-3" behind "@" indicates three data records (i.e., a 2,001-th data record (e.g., the third data record), a 2,002-th data record (e.g., the fourth data record), and a 2,003-th data record (e.g., the fifth data record)) from the 2,001-th data record among data records included in the second compression partition for the connection table "TAB2". In this case, all of the first data record to the fifth data record may be identified by the same primary key.

Figure 15:
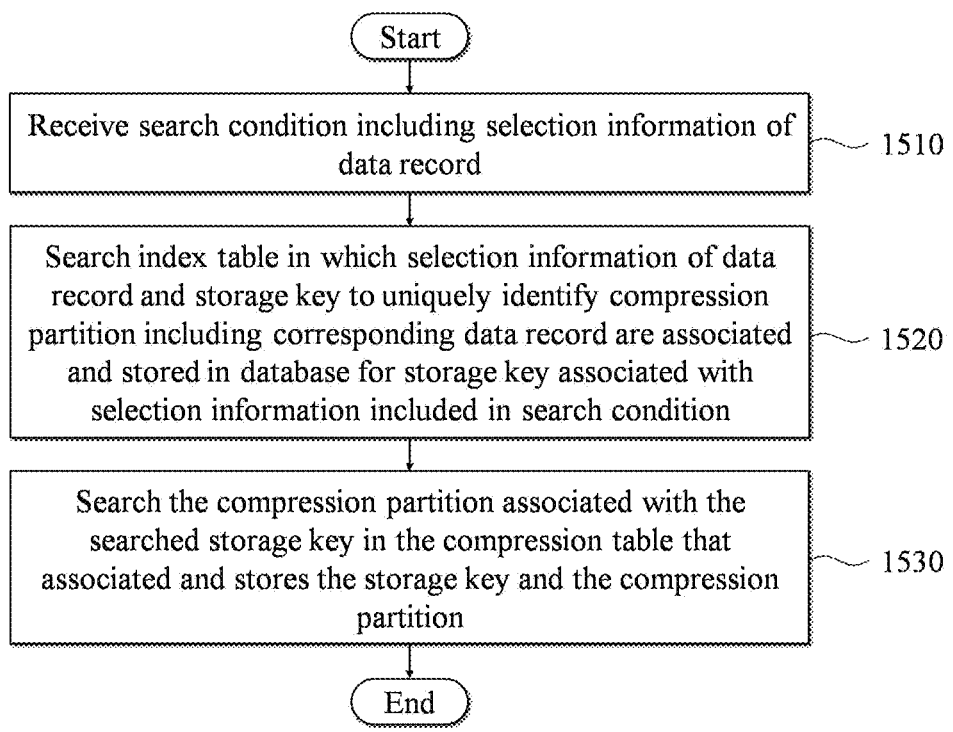
FIG. 15 is a diagram illustrating an example of a process of searching for archived data by using a second function in an embodiment of the present disclosure.

FIG. 15 is a diagram illustrating an example of a process of searching for archived data by using the second function in an embodiment of the present disclosure. The process according to the present embodiment may be performed by the computer device 200 that implements the target system 320 by using the second function provided by the data archiving system 310.

In step 1510, the computer device 200 may receive a search condition including selection information of a data record. The selection information may include a given field value of the data record to be searched for and/or information on time of the corresponding data record. The field value and/or the information on time included in the selection information may be included in the form of a range.

In step 1520, the computer device 200 may search an index table in which the selection information of the data record and a storage key to uniquely identify a compression partition including the corresponding data record are associated and stored in a database for the storage key associated with the selection information included in the search condition. As described above, the index table may include a group index table and/or a period index table. The group index table may associate and store a specific field value and a storage key. The period index table may associate and store information on time and a storage key. Accordingly, the computer device 200 may search the group index table and/or the period index table for a field value included in the selection information and/or the storage key corresponding to information on time. For example, if the selection information includes a given field value of a data record, the computer device 200 may search the group index table in which a storage key and the given field value are associated and stored for a storage key associated with the given field value included as the selection information of the search condition. For another example, if the selection information includes information on time of the data record, the computer device 200 may search the period index table in which the storage key and the information on time are associated and stored for the storage key associated with the information on time as the selection information of the search condition.

In step 1530, the computer device 200 may search a compression table in which the storage key and the compression partition are associated and stored for the compression partition associated with the retrieved storage key. As described above, a compression partition and a storage key to uniquely identify the compression partition are associated and stored in the compression table. Accordingly, the computer device 200 may search the compression table for the corresponding compression partition based on the storage key.

As described above, if a key index table is further used, a user may use a primary key for search. As described above, the key index table may associate and store a primary key, key index information, that is, a location of a corresponding data record within a compressed compression partition including the corresponding data record, and a storage key corresponding to the compressed compression partition including the corresponding data record, with respect to each of data records included in a given table in a database. In this case, if a search condition further includes the primary key of the data record, the computer device 200 may search the key index table for index information and a storage key associated with the primary key further included in the search condition. Thereafter, the computer device 200 may search the compression partition, searched for in step 1530, for a specific data record according to the search condition further based on the retrieved key index information and storage key.

Furthermore, if a connection table connected to a given table through the primary key is present, the key index table may further include sub-index information, that is, a location in a second compression partition of a data record, with respect to the second compression partition generated by compressing the data record in the connection table. Accordingly, if the search condition further includes the primary key, the computer device 200 may further search the key index table for sub-index information associated with the primary key further included in the search condition, and may also obtain a field value of the connection table connected to the first table through the primary key in addition to a field value of a first table with respect to a specific data record by further searching the second compression partition for a data record according to the search condition based on the second compression partition and the sub-index information.

As described above, the compression table may include a compression table of a database of another computer device connected to the computer device 200 over a network. In this case, in step 1530, the computer device 200 may search the compression table of the database of the another computer device for a compression partition associated with the storage key searched for in step 1520 over the network.

Steps 1510 to 1530 may be performed using the second function provided by the data archiving system 310. In other words, the data archiving system 310 may provide the second function including a function for controlling the target system 320 to perform steps 1510 to 1530.

Figure 16:
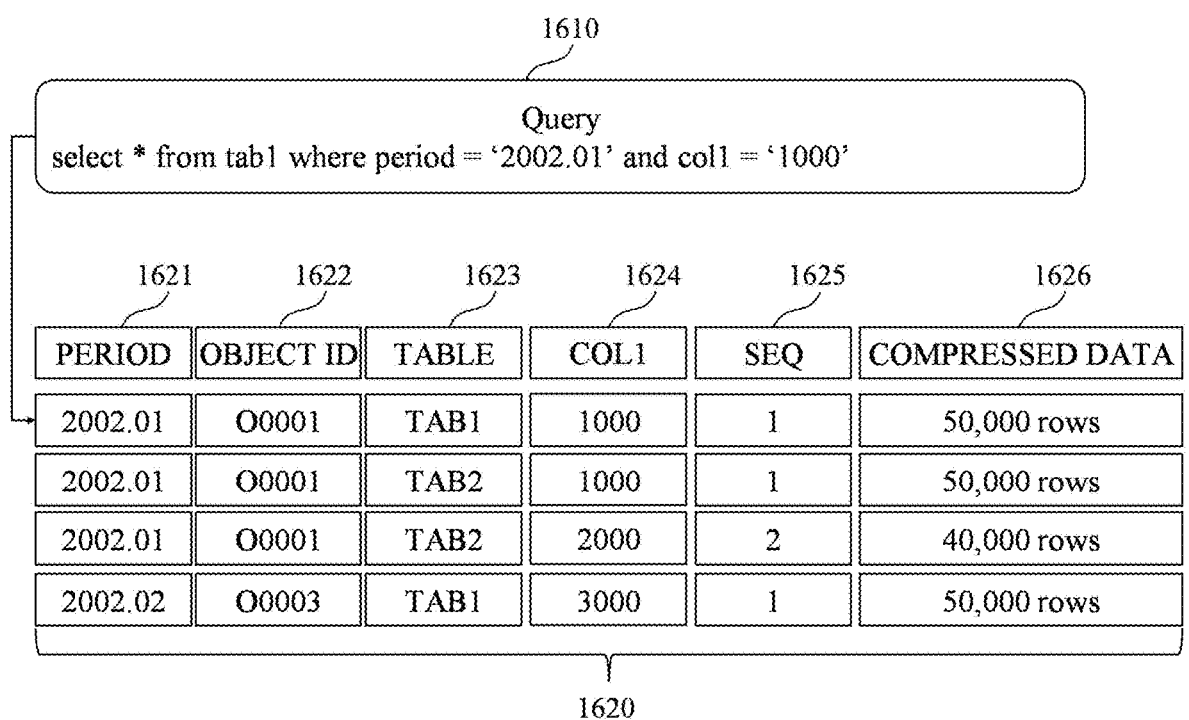
FIGS. 16 and 17 are diagrams illustrating examples in which archived data are searched for in an embodiment of the present disclosure.
Figure 17:
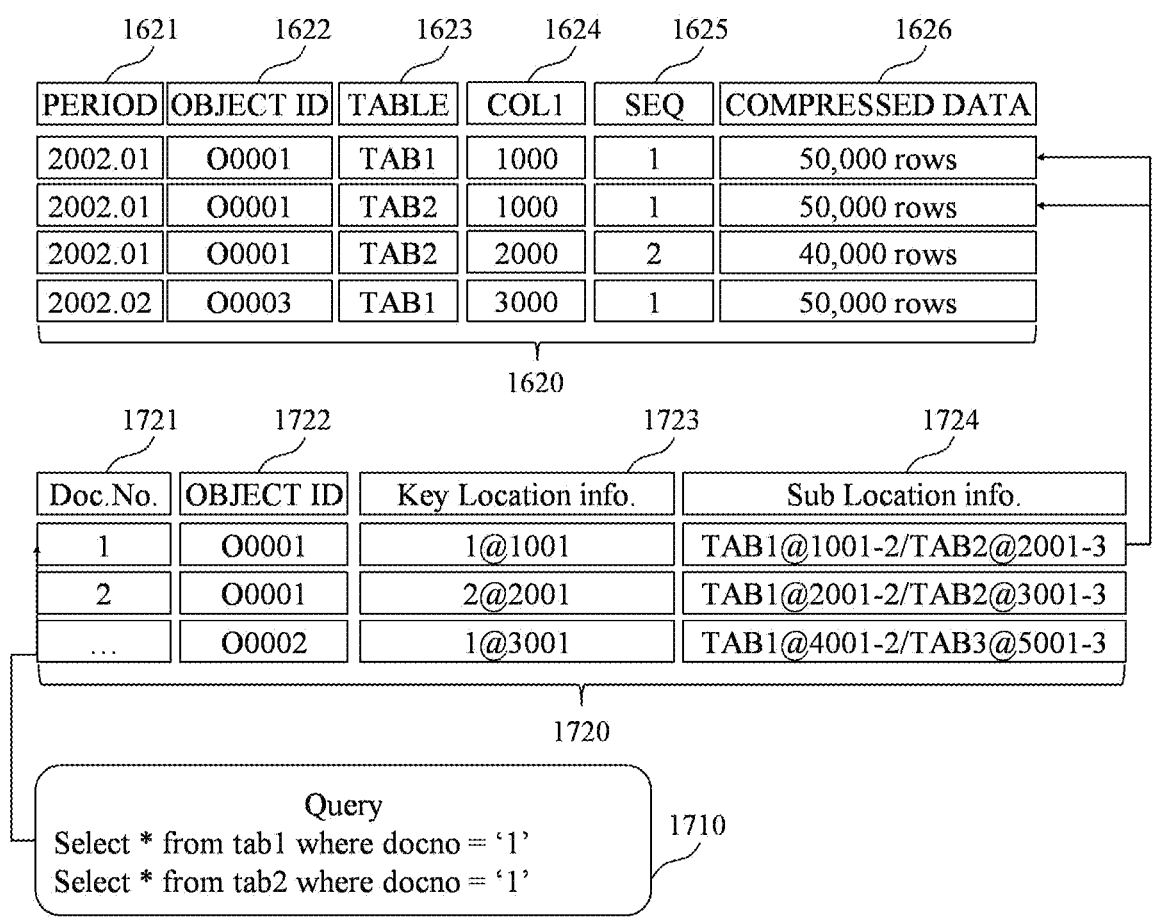

FIGS. 16 and 17 are diagrams illustrating examples in which archived data are searched for in an embodiment of the present disclosure.

FIG. 16 illustrates an example in which archived data is searched for in a compression table 1620 through a query 1610. In the embodiment of FIG. 16, the compression table 1620 has been combined with an index table, and includes a PERIOD field 1621, a COL1 field 1622, a TABLE field 1623, an OBJECT ID field 1624, an SEQ field 1625 and a COMPRESSED DATA field 1626. In some embodiments, the PERIOD field 1621 and the COL1 field 1622 may be present in a separate index table. In this case, in order to connect the compression table 1620 and the index table, the OBJECT ID field 1624 may be present in each of the two tables. In some embodiments, the TABLE field 1623 and the SEQ field 1625 may also be present in the index table.

In this case, the query 1610 may mean an instruction that a data record in which a field value of the PERIOD field 1621 is "2002.01" and a field value of the COL1 field 1622 is "1000" should be searched for in a table "TAB1." In this case, the computer device 200 may check, in the compression table 1620, that a data record corresponding to the query 1610 is a compression partition stored in the COMPRESSED DATA field 1626 of the first record of the compression table 1620. Accordingly, the computer device 200 may decompress the corresponding compression partition, and may provide, as results of the search, data records (data records of "50,000 rows") included in the corresponding compression partition.

FIG. 17 illustrates an example in which archived data is searched for in the compression table 1620 through a query 1710. In the embodiment of FIG. 17, a key index table 1720 may be used because the query 1710 uses a primary key as a search condition. The key index table 1720 includes a Doc.No. field 1721, an OBJECT ID field 1722, a Key Location Info. field 1723 and a Sub Location Info. field 1724.

In this case, the query 1710 may mean an instruction that a data record in which a field value of the Doc.No. field 1721 as a primary key is "1" should be searched for in a table "TAB1" and a table "TAB2." In this case, the computer device 200 may check, in the key index table 1720, the first record in which the field value of the Doc.No. field 1721 is "1", and may search the compression table 1620 for the data records having a primary key of "1" based on a field value of the Sub Location Info. field 1724 of the first record. For example, the computer device 200 may extract data records, each one having a primary key of "1", from the compression table 1620 based on sub-index information "TAB1 @1001-2/TAB2 @2001-3" of the first record of the key index table 1720 in which a field value of the Doc.No. field 1721 is "1". In this case, data records each having a value of a specific primary key can be searched for easily and rapidly based on a location included in the sub-index information although all data records of compression partitions are not searched for.

Referring back to FIG. 3, the data archiving system 310 can optimize data of the target system 320 and the storage system 330 by using a data query log in an embodiment in which another external system (e.g., a cloud storage system) of the target system 320 includes the storage system 330. For example, the data archiving system 310 may continuously optimize the amount of data and user access speed between the target system 320 and the storage system 330 by analyzing at least one of (1) a past table access log of an on-premise (owned and operated by a company as its own equipment not a cloud environment) database, (2) traffic predicted using machine learning based on the past table access log, and (3) an access log after data is switched to the storage system 330.

Figure 18:
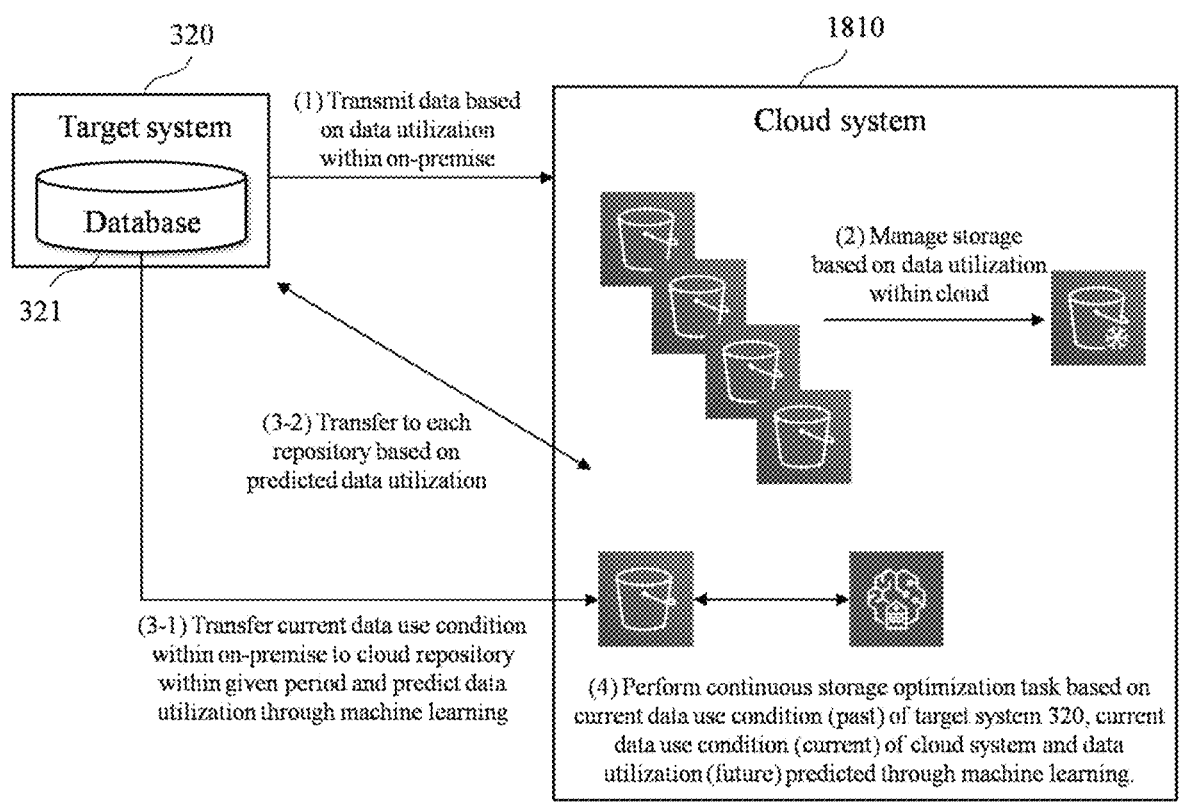
FIG. 18 is a diagram illustrating an example of a process for effectively storing data in an embodiment of the present disclosure.

FIG. 18 is a diagram illustrating an example of a process for effectively storing data in an embodiment of the present disclosure. FIG. 18 illustrates the target system 320 and a cloud system 1810. In the embodiment of FIG. 18, both the storage system 330 and the data archiving system 310 may be implemented in the cloud system 1810. In order to effectively store data in a remote repository (e.g., the storage system 330 implemented in the cloud system 1810), the data archiving system 310 may differently manage storage classes according to data utilization. For example, the data archiving system 310 may provide the target system 320 with a function for controlling the target system 320 to transmit data based on data utilization in an on-premise database. In this case, the data archiving system 310 may analyze a current data use condition of the target system 310 by using the function, may separate the data use condition into classes, and may separate data into the classes before transmitting the data to the cloud system 1810. In this case, the cloud system 1810 may also include a class storage for each class. Data of a class corresponding to a specific class storage may be stored.

Furthermore, the data archiving system 310 may monitor, separate and store a current use condition of data transmitted to the cloud system 1810 for each business object and period. For example, the data archiving system 310 may manage a storage based on data utilization within the repository of the cloud system 1810.

The data archiving system 310 may control a current data use condition of the target system 320 to be transmitted to the cloud system 1810, may analyze the usage of data through machine learning, and may store the usage in each class storage. For example, the data archiving system 310 may control the target system 310 to transfer a current data use condition within a company to the cloud system 1810 for a given period, and may predict data utilization based on the application of machine learning to the transferred current data use condition. Furthermore, the data archiving system 310 may process the transfer of data between the target system 320 and the cloud system 1810 so that the data can be optimized based on the predicted data utilization. For example, data having data utilization greater than a first threshold value among data stored in a repository (e.g., the storage system 320) of the cloud system 1810 may be transferred to a repository (e.g., the database 321) of the target system 320. Data having data utilization equal to or smaller than a second threshold value among the data stored in the repository of the target system 320 may be transferred to the repository of the cloud system 1810. The compression or decompression of data described with reference to the embodiments of FIGS. 3 to 17 may be necessary for the transfer of the data.

As described above, the data archiving system 310 may perform a continuous storage optimization task based on a current data use condition (past) of the target system 320, a current data use condition (current) of the cloud system and data utilization (future) predicted through machine learning.

As another embodiment, the data archiving system 310 may provide a function for optimizing performance of the target system 320. For example, a case where the target system 320 is located in a cloud environment in the form of an instance may be taken into consideration. In this case, for example, after data of the target system 320 is deleted (or after the usage of a storage space is reduced according to the aforementioned continuous storage optimization task), the data archiving system 310 may monitor overall performance (e.g., a CPU, a memory usage, or a system response speed) of the target system 320 located in the cloud environment in the form of an instance based on a database capacity of the target system 320, and can reduce a cost for the target system 320 by changing the specifications of the target system 320 into a server type capable of reducing a cost based on the monitored performance. For example, the data archiving system 310 may provide an instance optimization function in which both CPU efficiency and memory efficiency are considered not a data volume optimization viewpoint. To this end, the data archiving system 310 may review the optimization possibility of additional resource attributable to a reduction in the data volume. As a more detailed example, the data archiving system 310 may measure time for each flow by analyzing a technical bill of material (BOM) having high use frequency for a recent specific period (e.g., 1 year) and an internal structure of the program, and may reduce a processing time of database-related logic in order to reduce specifications, such as a CPU and a memory. Furthermore, the data archiving system 310 may change an instance for implementing the target system 320 into an instance that is economically one step lower compared to a class of an initial setting instance. A system response rate, CPU utilization, a processing time, a database response time, etc. in addition to the technical BOM and the internal structure of a program may be used to measure the time for each flow.

As another embodiment, the data archiving system 310 may provide a data unidentification function. Upon collection of data archiving, non-identification may be requested by business requirements and/or legal requirements. Alternatively, unidentification may be requested in order to use data archived in the storage system 330 in another system not the target system 320. FIG. 19 is a diagram illustrating an example of a method of unidentifying data in an embodiment of the present disclosure.

Figure 20:
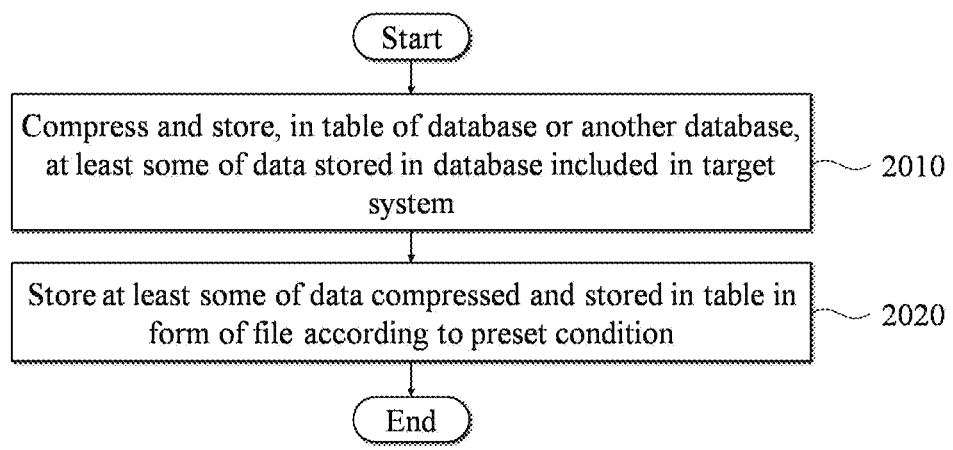
FIG. 20 is a diagram illustrating another example of a data archiving method according to an embodiment of the present disclosure.

FIG. 20 is a diagram illustrating another example of a data archiving method according to an embodiment of the present disclosure. The data archiving method according to the present embodiment may be performed by the computer device 200 that implements the data archiving system 310. In this case, the processor 220 of the computer device 200 may be implemented to execute a control instruction according to a code of an operating system or a code of at least one computer program included in the memory 210. In this case, the processor 220 may control the computer device 200 to execute steps 2010 to 2020 included in the method of FIG. 20 based on a control instruction provided by a code stored in the computer device 200. Furthermore, the computer program may correspond to the aforementioned archiving solution program.

In step 2010, the computer device 200 may compress and store, in a table of a database or another database, at least some of data stored in the database included in a target system. In this case, the target system may correspond to the target system 320. The database may correspond to the database 321. The another database may include a database included in an external system (e.g., the data archiving system 310 or third-party system separated from the target system 310) of the target system. A method of compressing and storing data in a table has been described in detail with reference to FIGS. 3 to 14. A method of searching for data compressed and stored in the table has been described in detail with reference to FIGS. 15 to 19. If data is compressed and stored in a table, the amount of data stored in the database of the target system can be greatly reduced and the computer device 200 can also search archived data for desired data easily and rapidly because the data is stored in the table in a compressed state through primary archiving as described above. Thereafter, the primary archived data in the table may be subjected to secondary archiving because the necessity for search for the primary archived data is reduced.

In step 2020, the computer device 200 may store at least some of the data compressed and stored in the table in the form of a file according to a preset condition. For example, the preset condition may include at least one of a first condition in which a secondary archiving instruction is received from a manager of the target system, a second condition in which the storage period of the data compressed and stored in the table elapses, a third condition in which a search request for the data compressed and stored in the table does not occur for a preset first period, and a fourth condition in which a search request for the data compressed and stored in the table is equal to or smaller than a preset number for a preset second period. In this case, in relation to the first condition, the secondary archiving instruction may be an explicit instruction that at least some of the data compressed and stored in the table should be stored in the form of a file. In this case, the computer device 200 may store the data specified by the archiving instruction in the form of a file, and may perform secondary archiving on the data. Furthermore, in relation to the second condition, a storage period may be set for the data compressed and stored in the table. In this case, the computer device 200 may store data whose storage period has elapsed, among the data compressed and stored in the table, may store the data in the form of a file, and may perform secondary archiving on the data. Furthermore, in relation to the third condition, the computer device 200 may store data for which a search request does not occur for the first period, among the data compressed and stored in the table, may store the data in the form of a file, and may perform secondary archiving on the data. Furthermore, in relation to the fourth condition, the computer device 200 may store data for which a search request is equal to or smaller than a preset number for the second period, among the data compressed and stored in the table, may store the data in the form of a file, and may perform secondary archiving on the data. In addition, it may be easily understood that at least some of the data compressed and stored in the table may be stored in the form of a file and subjected to secondary archiving depending on various conditions. For example, as described above, the data archiving system 310 can optimize data of the target system 320 and the storage system 330 by using a data query log in an embodiment in which another external system (e.g., a cloud storage system) of the target system 320 includes the storage system 330. In this case, as described above, the data archiving system 310 can continuously optimize the amount of data and a user access speed between the target system 320 and the storage system 330 by analyzing at least one of (1) a past table access log of an on-premise (owned and operated by a company as its own equipment not a cloud environment) database, (2) traffic predicted using machine learning based on the past table access log, and (3) an access log after data is switched to the storage system 330. In this case, the computer device 200 may process secondary archiving based on the predicted traffic through machine learning. In this case, the preset condition may include that the predicted traffic is equal to or smaller than a threshold value.

The computer device 200 may store the file in a local repository of the target system or a repository included in an external system (e.g., a file server or a cloud server) of the target system in step 2020. If a search request for the data stored in the form of a file and subjected to secondary archiving is present, after the data (i.e., compressed data) stored in the file is restored to the table again, desired data may be searched for using the search method described with reference to FIGS. 15 to 19.

Steps 2010 and 2020 may be a process of providing, by the computer device 200, a function that enables the target system to process the primary archiving and the secondary archiving. For example, the computer device 200 may provide a function for controlling the target system to compress and store, in a table of a database or another database, at least some of data stored in the database included in the target system in step 2010, and may provide a function for controlling the target system to store at least some of the data compressed and stored in the table in the form of a file according to a preset condition in step 2020.

As described above, according to embodiments of the present disclosure, primary archiving capable of rapidly searching for compressed and stored data can be processed by compressing and storing at least some of data stored in the database of the target system in a table of the database or another database. Secondary archiving can be processed on data for which search is no longer requested or for which a search request is low by storing at least some of the data compressed and stored in the table in the form of a file according to a preset condition.

The aforementioned system or device may be implemented by a hardware component or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processor so that it operates as desired or may instruct the processing devices independently or collectively. The software and/or data may be embodied in a machine, component, physical device, virtual equipment or computer storage medium or device of any type in order to be interpreted by the processor or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and stored in a computer-readable medium. The computer-readable medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or storage media managed in a server. Examples of the program instruction may include machine-language code, such as a code written by a compiler, and a high-level language code executable by a computer using an interpreter.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the aforementioned components, such as the system, structure, device or apparatus, and circuit, are coupled or combined in a form different from that of the described method or replaced or substituted with other components or equivalents.

Accordingly, other implementations, other embodiments, and equivalents of the claims fall within the scope of the claims.

The invention claimed is:

1. A data archiving method performed by a computer device comprising at least one processor, comprising steps of:
   compressing and storing, by the at least one processor, at least some of data stored in a database included in the target system in a table of the database or another database; and
   storing, by the at least one processor, at least some of the data compressed and stored in the table in a file form according to a preset condition,
   wherein the preset condition comprises at least one a first condition in which a search request for the data compressed and stored in the table does not occur for a preset first period and a second condition in which a search request for the data compressed and stored in the table is equal to or smaller than a preset number for a preset second period.

2. The data archiving method of claim 1, wherein the preset condition further comprises at least one of a third condition in which a secondary archiving instruction is received from a manager of the target system and a fourth condition in which a storage period of the data compressed and stored in the table elapses.

3. The data archiving method of claim 1, wherein the another database comprises a database included in an external system of the target system.

4. The data archiving method of claim 1, wherein the step of storing in a file form comprises storing the file in a local repository or the target system or a repository included in an external system of the target system.

5. The data archiving method of claim 1, wherein the step of compressing and storing in a table comprises steps of:
   determining a partition for a data record included in a target archiving table of the database included in the target system based on selection information of the data record;
   generating a compression partition by compressing the data record for each partition;
   associating and storing, in a compression table, the compression partition and a storage key to uniquely identify the compression partition; and
   associating and storing the storage key and the selection information in an index table of the database or the another database.

6. The data archiving method of claim 5, wherein the step of associating and storing in an index table comprises steps of:
   associating and storing the storage key and a given field value in a group index table of the database or the another database when the selection information comprises the given field value of a corresponding data record; and
   associating and storing the storage key and information on time in a period index table of the database or the another database when the selection information comprises the information on the time of a corresponding data record.

7. The data archiving method of claim 5, wherein the step of compressing and storing in a table further comprises associating and storing, in a key index table of the database or the another database, a primary key, key index information which is a location of a corresponding data record within a compressed compression partition comprising the corresponding data record, and a storage key corresponding to the compressed compression partition comprising the corresponding data record with respect to each of data records stored in the target archiving table.

8. The data archiving method of claim 7, wherein the step of associating and storing in a key index table comprises:
searching for a data record having the same primary key as a data record included in the target archiving table, among data records included in a second compression partition, with respect to the second compression partition generated by compressing a data record in a connection table connected to the table through the primary key, and
further storing sub-index information which is a location within the second compression partition for the retrieved data record with respect to the data record having the same primary key in the key index table.

9. The data archiving method of claim 5, wherein the step of compressing and storing in the table further comprises deleting the compressed data record from the target archiving table.

10. A non-transitory computer readable recording medium storing a computer program for executing the method according to claim 1 in the computer device.

11. A computer device comprising:
at least one processor implemented to execute a computer-readable instruction,
wherein the at least one processor
compresses and stores at least some of data stored in a database included in the target system in a table of the database or another database, and
stores at least some of the data compressed and stored in the table in a file form according to a preset condition,
wherein the preset condition comprises at least one a first condition in which a search request for the data compressed and stored in the table does not occur for a preset first period and a second condition in which a search request for the data compressed and stored in the table is equal to or smaller than a preset number for a preset second period.

* * * * *